No. 888,525. PATENTED MAY 26, 1908.
W. W. McCARTY.
LUBRICATOR.
APPLICATION FILED FEB. 6, 1908.
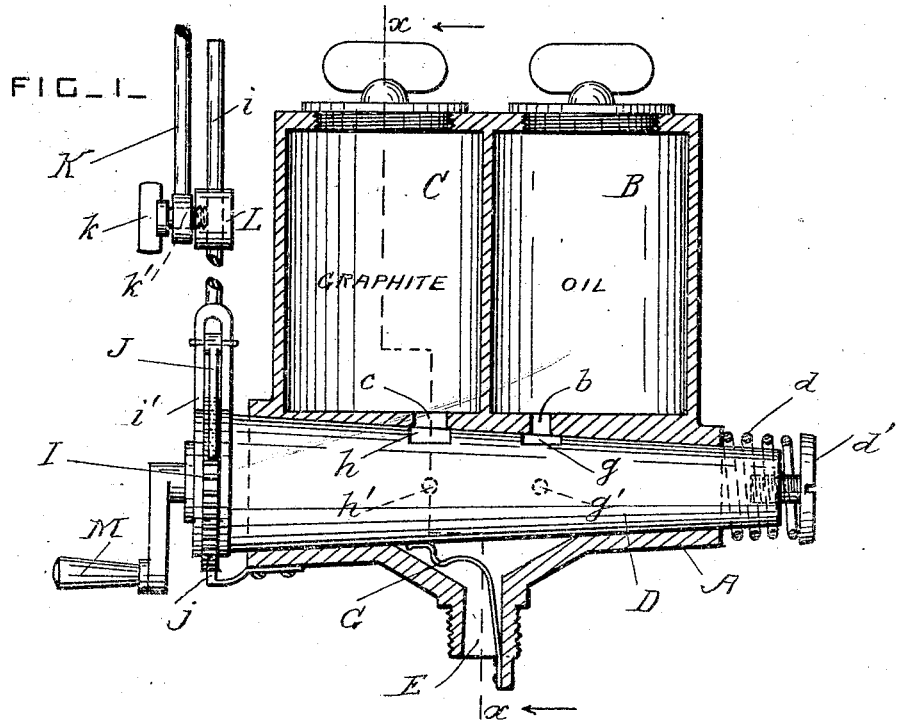
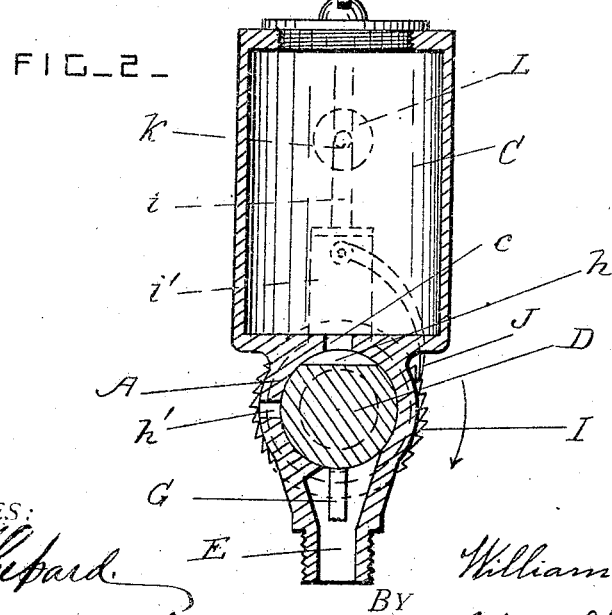
WITNESSES:
INVENTOR
William W. McCarty
BY
Herbert W. Jenner
Attorney

UNITED STATES PATENT OFFICE.

WILLIAM WILEY McCARTY, OF DIAMOND, INDIANA.

LUBRICATOR.

No. 888,525.   Specification of Letters Patent.   Patented May 26, 1908.

Application filed February 6, 1908. Serial No. 414,479.

*To all whom it may concern:*

Be it known that I, WILLIAM W. MCCARTY, a citizen of the United States, residing at Diamond, in the county of Parke and State of Indiana, have invented certain new and useful Improvements in Lubricators; and I do hereby declare the following to be a full, clear, and exact description of the invention, such as will enable others skilled in the art to which it appertains to make and use the same.

This invention relates to lubricators for supplying oil and graphite to cylinders and shaft bearings; and it consists in the novel construction and combination of the parts hereinafter fully described and claimed.

In the drawings, Figure 1 is a vertical section through the lubricator. Fig. 2 is a cross-section, taken on the line $x$—$x$ in Fig. 1.

A is the casing of the lubricator valve.

B and C are two cups or compartments for oil and for graphite, one or both of which may be used.

D is the valve of the lubricator which is conical in form, and which is journaled in the casing A. The valve is provided with a spring $d$ at its smaller end for holding it to its seat in the casing, and $d'$ is a screw en gaging with the smaller end portion of the valve and affording a means for adjusting the tension of the said spring. The compartments B and C are provided with outlet holes $b$ and $c$, respectively, which commu nicate with the valve chamber of the casing.

E is the delivery pipe which projects from the casing A, below the cups B and C, and which is connected to the engine cylinder or any portion of a machine which is to be lubricated.

The valve D is provided with two cavities or slots $g$ and $h$ in its periphery, which communicate with the holes $b$ and $c$ respectively when turned upward, and which communi cate with the delivery pipe E when turned downward.

Exhaust holes $g'$ and $h'$ are provided in the side of the casing A when the lubricator is to be used on a steam cylinder. A spring scraper G is secured in the delivery passage of the casing A in the path of the cavity $h$ which delivers graphite to assist in discharging the graphite from the cavity. This spring scraper is pressed downwardly by the periphery of the valve when the cavity or slot is turned upward. The valve is revolved step by step by any approved driving mechanism.

I is a ratchet toothed wheel secured to the valve, and $i$ is a lever provided with a forked end portion $i'$ which straddles the wheel I and which is journaled on the valve. J is a driving pawl pivoted to the said lever and engaging with the teeth of the ratchet wheel. A check pawl or spring $j$ is secured to the casing A, and also engages with the ratchet wheel so that it cannot revolve backward.

K is an operating rod which is connected to any convenient reciprocating portion of the engine or machine.

L is a disk which is adjustable longitudinally on the lever $i$, and which is secured thereon by means of a set-screw $k$. The rod K is pivoted on the smooth portion $k'$ of the set-screw $k$ so that it rocks the lever back and forth and revolves the valve. The valve can be revolved at any desired speed by adjusting the position of the disk L on the lever.

M is a crank-handle secured to the valve for the purpose of revolving it by hand whenever necessary, or before the engine is started. The graphite and the oil descend into the cavities by gravity when said cavities are placed in communication with the cups or compartments, and the said cavities are emptied of their contents when turned downward by gravity and by the spring scraper. The exhaust holes relieve the cavities of steam pressure when being moved upward and after the lubricant has been discharged from them, so that the steam is not carried up into the cups.

By the use of this device oil and graphite can be fed simultaneously, and the oil assists in carrying down the graphite in the delivery pipe. In this manner the cylinder can be supplied satisfactorily with both oil and graphite in definite proportions, which can not be accomplished satisfactorily when a single cup is used.

What I claim is:

1. In a lubricator, the combination, with a casing provided at its upper part with two compartments for oil and for graphite respectively, and having at its lower part a single delivery pipe common to both the said compartments, of a valve journaled in the said casing and provided with two cavities or slots for transferring oil and graphite from the respective compartments to the said pipe, and means for revolving the said valve.

2. In a lubricator, the combination, with a casing provided with a cup for lubricant at its upper part and a delivery pipe beneath it, of a valve journaled in the said casing and provided with a cavity for transferring lubricant from the said cup to the said pipe, a spring scraper secured in the said pipe and engaging with the said cavity when turned downward, and means for revolving the said valve.

3. In a lubricator, the combination, with a casing provided with two compartments for oil and for graphite respectively, and having a single delivery pipe common to both the said compartments, of a valve journaled in the said casing and provided with an oil cavity and a graphite cavity for transferring oil and graphite from their respective compartments to the said pipe, a spring scraper secured in the said pipe for emptying the graphite cavity, and means for actuating the said valve.

In testimony whereof I have affixed my signature in the presence of two witnesses.

WILLIAM WILEY McCARTY.

Witnesses:
HARVEY LEE WINTERS,
W. A. BRITTON.